US012637524B2

(12) United States Patent
Gao et al.

(10) Patent No.: US 12,637,524 B2
(45) Date of Patent: May 26, 2026

(54) POLYMERIZATION CATALYST HAVING A TETRADENTATE LIGAND

(71) Applicant: NOVA CHEMICALS (INTERNATIONAL) S.A., Fribourg (CH)

(72) Inventors: Xiaoliang Gao, Calgary (CA); Jia Mo, Calgary (CA); Janelle Smiley-Wiens, Calgary (CA)

(73) Assignee: NOVA CHEMICALS (INTERNATIONAL) S.A., Fribourg (CH)

( * ) Notice: Subject to any disclaimer, the term of this patent is extended or adjusted under 35 U.S.C. 154(b) by 747 days.

(21) Appl. No.: 17/913,142

(22) PCT Filed: Mar. 15, 2021

(86) PCT No.: PCT/IB2021/052127

§ 371 (c)(1),
(2) Date: Sep. 20, 2022

(87) PCT Pub. No.: WO2021/191724

PCT Pub. Date: Sep. 30, 2021

(65) Prior Publication Data

US 2023/0148294 A1 May 11, 2023

Related U.S. Application Data

(60) Provisional application No. 62/993,741, filed on Mar. 24, 2020.

(51) Int. Cl.
*C08F 4/659* (2006.01)
*C08F 210/16* (2006.01)

(52) U.S. Cl.
CPC ............ *C08F 4/659* (2013.01); *C08F 210/16* (2013.01)

(58) Field of Classification Search
None
See application file for complete search history.

(56) References Cited

U.S. PATENT DOCUMENTS

| | | | |
|---|---|---|---|
| 5,589,555 | A | 12/1996 | Zboril et al. |
| 6,372,864 | B1 | 4/2002 | Brown |
| 6,777,509 | B2 | 8/2004 | Brown et al. |
| 6,841,502 | B2 | 1/2005 | Boussie et al. |
| 7,060,848 | B2 | 6/2006 | Boussie et al. |
| 7,241,714 | B2 | 7/2007 | Boussie et al. |
| 8,101,696 | B2 | 1/2012 | Konze et al. |
| 8,349,984 | B2 | 1/2013 | Konze et al. |
| 8,354,484 | B2 | 1/2013 | Konze et al. |
| 8,450,438 | B2 | 5/2013 | Aboelella et al. |
| 8,609,794 | B2 | 12/2013 | Klosin et al. |
| 9,029,487 | B2 | 5/2015 | Klosin et al. |
| 9,522,855 | B2 | 12/2016 | Klosin et al. |
| 9,605,098 | B2 | 3/2017 | Klosin et al. |
| 9,751,998 | B2 | 9/2017 | Klosin et al. |
| 9,828,476 | B2 | 11/2017 | Bensason et al. |
| 9,834,712 | B2 | 12/2017 | Kapur et al. |
| 10,059,787 | B2 | 8/2018 | Demirors et al. |
| 10,144,791 | B2 | 12/2018 | Klosin et al. |
| 10,195,589 | B2 | 2/2019 | Faler et al. |
| 10,214,622 | B2 | 2/2019 | Klosin et al. |
| 2017/0096510 | A1 | 4/2017 | Ye et al. |

FOREIGN PATENT DOCUMENTS

| | | | |
|---|---|---|---|
| CA | 2483192 | A1 | 11/2003 |
| EP | 2 024 401 | B1 | 2/2015 |

OTHER PUBLICATIONS

ASTM D6474-12—Standard Test Method for Determining Molecular Weight Distribution and Molecular Weight Averages of Polyolefins by High Temperature Gel Permeation Chromatography—Copyright ASTM International—Current edition approved Dec. 15, 2012. Published Dec. 2012. Originally approved in 1999. Last previous edition approved in 2006 as D6474-99. pp. 1-6.
ASTM D6645-01—Standard Test Method for Methyl (Comonomer) Content in Polyethylene by Infrared Spectrophotometry—Copyright ASTM International—Current edition approved Jan. 1, 2010. Published Jan. 2010. Originally approved in 2001. Last previous edition approved in 2001 as D6645-01. pp. 1-4.
Grubbs et al., "Safe and Convenient Procedure for Solvent Purification", Organometallics, 1996, pp. 1518-1520, vol. 15, 1996 American Chemical Society.
International Search Report & Written Opinion of the International Searching Authority issued in PCT Application No. PCT/IB2021/052127, mailed Jun. 16, 2021.

*Primary Examiner* — Catherine S Branch
(74) *Attorney, Agent, or Firm* — Thomas J. Styslinger, Reg. No. 75185

(57) ABSTRACT

A new olefin polymerization catalyst is ligated with a tetradentate ligand having a phenoxy/amino/ether/phenoxy (O/N/O/O) atom donor set. The new polymerization catalyst which is based on zirconium or hafnium produces an ethylene copolymer with high molecular weight and high comonomer incorporation levels.

17 Claims, No Drawings

POLYMERIZATION CATALYST HAVING A TETRADENTATE LIGAND

CROSS-REFERENCE TO RELATED APPLICATIONS

This application is a U.S. National Phase Application under 35 U.S.C. § 371 of International Application No. PCT/IB2021/052127, filed Mar. 15, 2021, which claims priority to and the benefit of U.S. Provisional Application No. 62/993,741, filed Mar. 24, 2020, both of which are hereby incorporated by reference in their entireties.

TECHNICAL FIELD

A new polymerization catalyst having a tetradentate ligand is used to copolymerize ethylene with and alpha olefin. The new polymerization catalyst which is based on zirconium or hafnium is ligated with a ligand having a phenoxy/amino/ether/phenoxy (O/N/O/O) atom donor set.

BACKGROUND ART

Since they were first discovered the use of "post metallocene" olefin polymerization catalysts bearing polyvalent aryloxyether ligands has become a well-developed art field, and numerous catalyst variants are available in the patent literature. These catalysts are particularly noteworthy for their ability to perform well in a high temperature solution polymerization process.

SUMMARY OF INVENTION

In an effort to build out the scope of these "post metallocene" catalysts and their use in a solution phase polymerization process, we have discovered a new olefin polymerization catalyst ligated with a tetradentate ligand having a phenoxy/amino/ether/phenoxy (O/N/O/O) atom donor set.

An embodiment of the disclosure is a polymerization process comprising polymerizing ethylene with one or more $C_{3-12}$ alpha olefins in the presence of a polymerization catalyst system comprising: i) a catalyst composition having the formula:

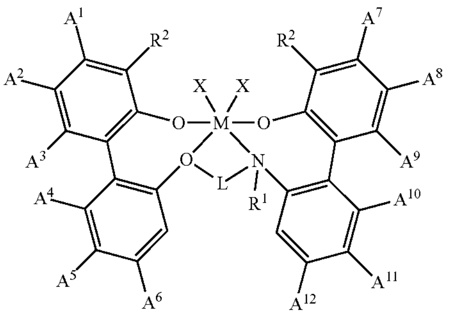

wherein M is Hf or Zr; $R^1$ is a hydrogen, an optionally substituted hydrocarbyl group, or an optionally substituted heteroatom containing hydrocarbyl group; each $R^2$ is independently an optionally substituted hydrocarbyl group, or an optionally substituted heteroatom containing hydrocarbyl group; each of $A^1$, $A^2$, $A^3$, $A^4$, $A^5$, $A^6$, $A^7$, $A^8$, $A^9$, $A^{10}$, $A^{11}$ and $A^{12}$ is a hydrogen, a halide, an optionally substituted hydrocarbyl group, or an optionally substituted heteroatom containing hydrocarbyl group; L is an optionally substituted bivalent hydrocarbyl group, or an optionally substituted bivalent heteroatom containing hydrocarbyl group; optionally two or more adjacent A groups may be part of a ring structure; and each X is independently an activatable leaving group; and ii) a catalyst activator.

An embodiment of the disclosure is an olefin pre-polymerization catalyst having the formula:

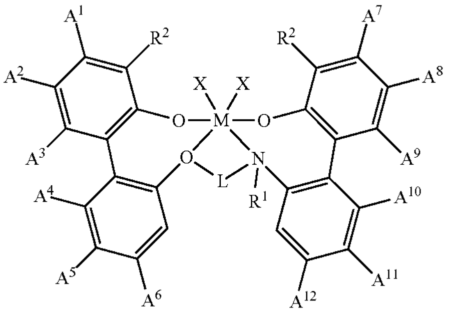

wherein M is Hf or Zr; $R^1$ is a hydrogen, an optionally substituted hydrocarbyl group, or an optionally substituted heteroatom containing hydrocarbyl group; each $R^2$ is independently an optionally substituted hydrocarbyl group, or an optionally substituted heteroatom containing hydrocarbyl group; each of $A^1$, $A^2$, $A^3$, $A^4$, $A^5$, $A^6$, $A^7$, $A^8$, $A^9$, $A^{10}$, $A^{11}$ and $A^{12}$ is a hydrogen, a halide, an optionally substituted hydrocarbyl group, or an optionally substituted heteroatom containing hydrocarbyl group; L is an optionally substituted bivalent hydrocarbyl group, or an optionally substituted bivalent heteroatom containing hydrocarbyl group; optionally two or more adjacent A groups may be part of a ring structure; and each X is independently an activatable leaving group.

An embodiment of the disclosure is an olefin polymerization catalyst system comprising: i) a catalyst composition having the formula:

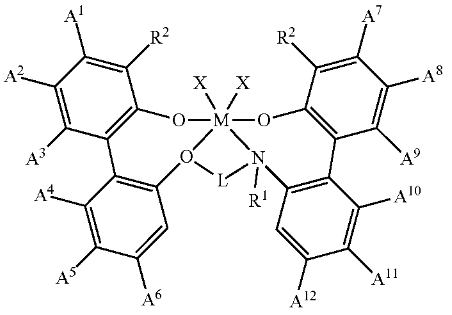

wherein M is Hf or Zr; $R^1$ is a hydrogen, an optionally substituted hydrocarbyl group, or an optionally substituted heteroatom containing hydrocarbyl group; each $R^2$ is independently an optionally substituted hydrocarbyl group, or an optionally substituted heteroatom containing hydrocarbyl group; each of $A^1$, $A^2$, $A^3$, $A^4$, $A^5$, $A^6$, $A^7$, $A^8$, $A^9$, $A^{10}$, $A^{11}$ and $A^{12}$ is a hydrogen, a halide, an optionally substituted hydrocarbyl group, or an optionally substituted heteroatom containing hydrocarbyl group; L is an optionally substituted bivalent hydrocarbyl group, or an optionally substituted bivalent heteroatom containing hydrocarbyl group; optionally two or more adjacent A groups may be part of a ring structure; and each X is independently an activatable leaving group; and ii) a catalyst activator.

DESCRIPTION OF EMBODIMENTS

The olefin polymerization catalysts described herein usually require activation by one or more cocatalytic or activator species in order to provide polymer from olefins. Hence, an un-activated olefin polymerization catalyst may be described as an olefin "pre-polymerization catalyst".

The olefin polymerization catalyst employed in the present disclosure is one having a tetradentate type ligand, one which has a phenoxy/amino/ether/phenoxy (O/N/O/O) atom donor set.

The olefin polymerization catalyst may be used in combination with further catalyst components such as but not limited to one or more than one support, one or more than one catalyst activator and one or more than one catalyst modifier.

The olefin pre-polymerization catalyst used in an embodiment of the disclosure is defined by the following formula:

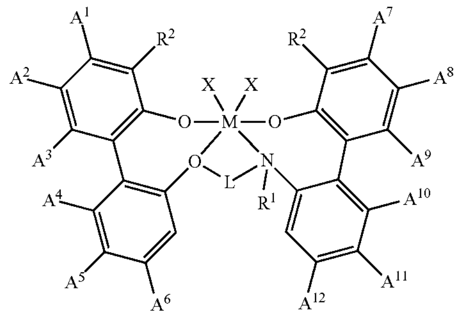

wherein M is Hf or Zr; $R^1$ is a hydrogen, an optionally substituted hydrocarbyl group, or an optionally substituted heteroatom containing hydrocarbyl group; each $R^2$ is independently an optionally substituted hydrocarbyl group, or an optionally substituted heteroatom containing hydrocarbyl group; each of $_A{}^1$, $A^2$, $A^3$, $A^4$, $A^5$, $A^6$, $A^7$, $A^8$, $A^9$, $A^{10}$, $A^{11}$ and $A^{12}$ is a hydrogen, a halide, an optionally substituted hydrocarbyl group, or an optionally substituted heteroatom containing hydrocarbyl group; L is an optionally substituted bivalent hydrocarbyl group, or an optionally substituted bivalent heteroatom containing hydrocarbyl group; optionally two or more adjacent A groups may be part of a ring structure; and each X is independently an activatable leaving group.

As used herein, the terms "hydrocarbyl", "hydrocarbyl radical" or "hydrocarbyl group" refers to acyclic, cyclic, linear or branched, aliphatic, olefinic, acetylenic and aryl (aromatic) radicals comprising hydrogen and carbon that are deficient by one hydrogen.

The term "cyclic" connotes hydrocarbyl groups or heteroatom containing hydrocarbyl groups that comprise cyclic moieties and which may have one or more than one cyclic aromatic ring, and/or one or more than one non-aromatic ring. The term "acyclic" connotes hydrocarbyl groups or heteroatom containing hydrocarbyl groups that do not have cyclic moieties such as aromatic or non-aromatic ring structures present within them.

As used herein, the phrase "heteroatom" includes any atom other than carbon and hydrogen that can be bound to carbon. The term "heteroatom containing" or "heteroatom containing hydrocarbyl group" means that one or more than one non carbon atom(s) will be present in the group being referred to (e.g. the hydrocarbyl group). Some non-limiting examples of non-carbon atoms that may be present in a heteroatom containing hydrocarbyl group are N, O, S, P, B and Si as well as halides such as for example Br and metals such as Sn. Some non-limiting examples of heteroatom containing hydrocarbyl groups include for example imines, amine moieties, oxide moieties, phosphine moieties, ethers, ketones, heterocyclics, oxazolines, thioethers, and the like.

As used herein the term "substituted" means that the group referred to by this term possesses one or more moieties that have replaced one or more hydrogen radicals in any position within the group; non-limiting examples of moieties include halogen radicals (F, Cl, Br), an alkyl group, an alkylaryl group, an arylalkyl group, an alkoxy group, an aryl group, an aryloxy group, an amido group, a silyl group or a germanyl group, hydroxyl groups, carbonyl groups, carboxyl groups, amine groups, phosphine groups, phenyl groups, naphthyl groups, $C_1$ to $C_{10}$ alkyl groups, $C_2$ to $C_{10}$ alkenyl groups, and combinations thereof.

By the use of the term "optional" or "optionally", it is meant that the subsequently described circumstance may or may not occur or be present and that the description includes instances where the circumstance occurs and instances where it does not. For example, the phrase "optionally substituted hydrocarbyl group" means that a hydrocarbyl group may or may not be substituted and that the description includes both a substituted hydrocarbyl group and a hydrocarbyl group which is not further substituted.

A "bivalent hydrocarbyl group" is a hydrocarbyl group which bridges two molecular moieties together. Such "bivalent hydrocarbyl groups" include "alkylene", "alkenylene" and "alkynylene" groups which may optionally be further substituted. Such "bivalent hydrocarbyl groups" also include aryl moieties which is bonded at two points to atoms, molecules or moieties with the two bonding points being covalent bonds.

A "bivalent heteroatom containing hydrocarbyl group" means that one or more than one non carbon atom(s) will be present within the hydrocarbyl group. Some non-limiting examples of non-carbon atoms that may be present within a bivalent heteroatom containing hydrocarbyl group are N, O, S, P and Si as well as halides such as for example Br and metals such as Sn.

As used herein, an "alkyl radical" or "alkyl group" includes linear, branched and cyclic paraffin radicals that are deficient by one hydrogen radical; non-limiting examples include methyl ($-CH_3$) and ethyl ($-CH_2CH_3$) radicals.

In an embodiment of the disclosure an alkyl group has from 1 to about 50 carbon atoms.

In embodiments of the disclosure an alkyl is methyl, ethyl, n-propyl, isopropyl, n-butyl, iso-butyl, t-butyl, octyl, decyl, and the like, as well as cycloalkyl groups such as cyclopentyl, cyclohexyl and the like.

In an embodiment of the disclosure, an alkyl group contains from 1 to 12 carbon atoms.

A "substituted alkyl" refers to alkyl substituted with one or more substituent groups (e.g., benzyl or chloromethyl), and the terms "heteroatom containing alkyl", "heteroatom containing alkyl group" and "heteroalkyl" refer to an alkyl group in which at least one carbon atom is replaced with a heteroatom (e.g., $-CH_2OCH_3$ is an example of a heteroalkyl).

The term "alkenyl radical" or "alkenyl group" refers to linear, branched and cyclic hydrocarbons containing at least one carbon-carbon double bond that is deficient by one hydrogen radical. In an embodiment of the disclosure an "alkenyl" group is a branched or unbranched hydrocarbon group having from 2 to 50 carbon atoms and at least one double bond. Some non-limiting examples of an alkenyl group include ethenyl, n-propenyl, iso-propenyl, n-butenyl, iso-butenyl, octenyl, decenyl, and the like.

In an embodiment of the disclosure, an alkenyl group contains 2 to about 12 carbon atoms.

A "substituted alkenyl" refers to alkenyl substituted with one or more substituent groups, and the terms "heteroatom containing alkenyl", "heteroatom containing alkenyl group" and "heteroalkenyl" refer to an alkenyl group in which at least one carbon atom is replaced with a heteroatom.

The term "alkynyl radical" or "alkynyl group" refers to linear, branched and cyclic hydrocarbons containing at least one carbon-carbon triple bond that is deficient by one hydrogen radical. In an embodiment of the disclosure an "alkynyl" group is a branched or unbranched hydrocarbon group containing from 2 to 50 carbon atoms and at least one triple bond. Some non-limiting examples of an alkynyl group include as ethynyl, n-propynyl, iso-propynyl, n-butynyl, isobutynyl, octynyl, decynyl, and the like.

In an embodiment of the disclosure, an alkynyl group has from 2 to 12 carbon atoms.

A "substituted alkynyl" refers to alkynyl substituted with one or more substituent groups, and the terms "heteroatom-containing alkynyl" and "heteroalkynyl" refer to alkynyl in which at least one carbon atom is replaced with a heteroatom.

As used herein, the term "aryl" group includes phenyl, naphthyl, pyridyl and other radicals whose molecules have an aromatic ring structure; non-limiting examples include naphthylene, phenanthrene and anthracene. An "alkylaryl" group is an alkyl group having an aryl group pendant there from; non-limiting examples include benzyl, phenethyl and tolylmethyl. An "arylalkyl" is an aryl group having one or more alkyl groups pendant there from; non-limiting examples include tolyl, xylyl, mesityl and cumyl.

"Substituted aryl" refers to an aryl moiety substituted with one or more substituent groups, (e.g., tolyl, mesityl and perfluorophenyl) and the terms "heteroatom-containing aryl" and "heteroaryl" refer to aryl in which at least one carbon atom is replaced with a heteroatom (e.g., rings such as thiophene, pyridine, isoxazole, pyrazole, pyrrole, furan, etc. or benzo-fused analogues of these rings are included in the term "heteroaryl").

In some embodiments herein, multi-ring moieties are substituents and in such embodiments the multi-ring moiety can be attached at an appropriate atom. For example, "naphthyl" can be 1-naphthyl or 2-naphthyl; "anthracenyl" can be 1-anthracenyl, 2-anthracenyl or 9-anthracenyl; and "phenanthrenyl" can be 1-phenanthrenyl, 2-phenanthrenyl, 3- phenanthrenyl, 4-phenanthrenyl or 9-phenanthrenyl.

The terms "halide" and "halogen" are used in the conventional sense to refer to a chloro, bromo, fluoro or iodo substituent. The terms "haloalkyl", "haloalkenyl" or "haloalkynyl" (or "halogenated alkyl", "halogenated alkenyl", or "halogenated alkynyl") refers to an alkyl, alkenyl or alkynyl group, respectively, in which at least one of the hydrogen atoms in the group has been replaced with a halogen atom.

In an embodiment of the disclosure, a heteroatom containing hydrocarbyl group is a hydrocarbyl group containing from 1 to 3 atoms selected from the group consisting of boron, aluminum, silicon, germanium, nitrogen, phosphorous, oxygen and sulfur.

The terms "cyclic heteroatom containing hydrocarbyl" or "heterocyclic" refer to ring systems having a carbon backbone that further comprises at least one heteroatom selected from the group consisting of for example boron, aluminum, silicon, germanium, nitrogen, phosphorous, oxygen and sulfur.

An "alkoxy" group is an oxy group having an alkyl group pendant there from; and includes for example a methoxy group, an ethoxy group, an iso-propoxy group, and the like.

An "aryloxy" group is an oxy group having an aryl group pendant there from; and includes for example a phenoxy group and the like.

In an embodiment of the disclosure an olefin pre-polymerization catalyst is defined by the following formula:

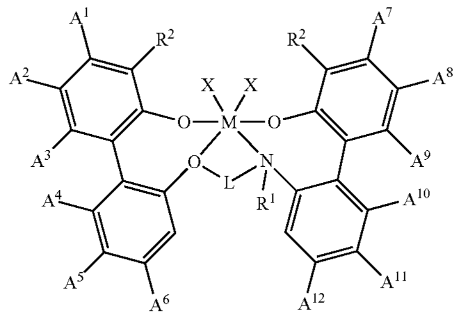

wherein M is Hf or Zr; $R^1$ is a hydrogen, an optionally substituted hydrocarbyl group, or an optionally substituted heteroatom containing hydrocarbyl group; each $R^2$ is independently an optionally substituted hydrocarbyl group, or an optionally substituted heteroatom containing hydrocarbyl group; each of $A^1$, $A^2$, $A^3$, $A^4$, $A^5$, $A^6$, $A^7$, $A^8$, $A^9$, $A^{10}$, $A^{11}$ and $A^{12}$ is a hydrogen, a halide, an optionally substituted hydrocarbyl group, or an optionally substituted heteroatom containing hydrocarbyl group; L is an optionally substituted bivalent hydrocarbyl group, or an optionally substituted bivalent heteroatom containing hydrocarbyl group; optionally two or more adjacent A groups may be part of a ring structure; and each X is independently an activatable leaving group.

In an embodiment of the disclosure an olefin polymerization catalyst system comprises: i) a catalyst composition having the formula:

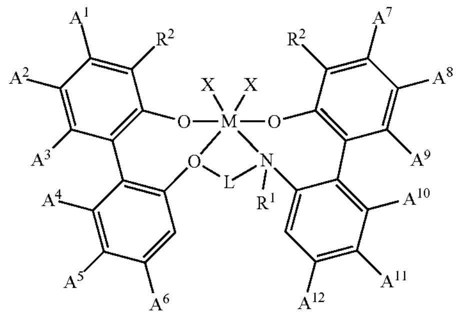

wherein M is Hf or Zr; $R^1$ is a hydrogen, an optionally substituted hydrocarbyl group, or an optionally substituted heteroatom containing hydrocarbyl group; each $R^2$ is independently an optionally substituted hydrocarbyl group, or an optionally substituted heteroatom containing hydrocarbyl group; each of $A^1$, $A^2$, $A^3$, $A^4$, $A^5$, $A^6$, $A^7$, $A^8$, $A^9$, $A^{10}$, $A^{11}$ and $A^{12}$ is a hydrogen, a halide, an optionally substituted hydrocarbyl group, or an optionally substituted heteroatom containing hydrocarbyl group; L is an optionally substituted bivalent hydrocarbyl group, or an optionally substituted bivalent heteroatom containing hydrocarbyl group; optionally two or more adjacent A groups may be part of a ring structure; and each X is independently an activatable leaving group; and ii) a catalyst activator.

In an embodiment of the disclosure, each $R^2$ is independently an optionally substituted aryl group or an optionally substituted heteroatom containing aryl group.

In an embodiment of the disclosure, each $R^2$ is independently an optionally substituted heteroatom containing aryl group.

In an embodiment of the disclosure, each $R^2$ is independently a substituted heteroatom containing aryl group.

In an embodiment of the disclosure, each $R^2$ is a substituted heteroatom containing aryl group.

In an embodiment of the disclosure, each $R^2$ has the formula:

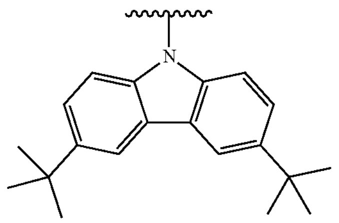 [SMILES: *n1c2ccc(C(C)(C)C)cc2c2cc(C(C)(C)C)ccc21]

In an embodiment of the disclosure, L is an optionally substituted bivalent hydrocarbyl group.

In an embodiment of the disclosure, L is a bivalent hydrocarbon group.

In an embodiment of the disclosure, L is a bivalent alkylene group.

In an embodiment of the disclosure, L is a bivalent cycloalkylene group.

In an embodiment of the disclosure, L is a bivalent aryl group.

In an embodiment of the disclosure, L is a bivalent alkylene group having from 2 to 8 carbon atoms.

In an embodiment of the disclosure, L is a bivalent n-propyl group having the formula: $—CH_2CH_2CH_2—$.

In an embodiment of the disclosure, $A^2$ and $A^8$ are independently an optionally substituted hydrocarbon group or an optionally substituted heteroatom containing hydrocarbon group.

In an embodiment of the disclosure, $A^2$ and $A^8$ are independently an optionally substituted hydrocarbon group.

In an embodiment of the disclosure, $A^2$ and $A^8$ are independently a hydrocarbon group.

In an embodiment of the disclosure, $A^2$ and $A^8$ are independently an optionally substituted alkyl group.

In an embodiment of the disclosure, $A^2$ and $A^8$ are independently an alkyl group.

In an embodiment of the disclosure, $A^2$ and $A^8$ are each an alkyl group having from 1 to 20 carbon atoms.

In an embodiment of the disclosure, $A^2$ and $A^8$ are each an alkyl group having from 1 to 8 carbon atoms.

In an embodiment of the disclosure, $A^2$ and $A^8$ are each a methyl group.

In an embodiment of the disclosure $A^1$, $A^3$, $A^4$, $A^5$, $A^6$, $A^7$, $A^9$, $A^{10}$, $A^{11}$ and $A^{12}$ are each a hydrogen or a halide.

In an embodiment of the disclosure $A^1$, $A^3$, $A^4$, $A^5$, $A^6$, $A^7$, $A^9$, $A^{10}$, $A^{11}$ and $A^{12}$ are each a hydrogen.

In an embodiment of the disclosure $A^1$, $A^3$, $A^4$, $A^5$, $A^6$, $A^7$, $A^9$, $A^{10}$, $A^{11}$ and $A^{12}$ are each a hydrogen or a fluoride.

In an embodiment of the disclosure $A^1$, $A^3$, $A^4$, $A^5$, $A^6$, $A^7$, $A^9$, $A^{10}$, $A^{11}$ and $A^{12}$ are each a halide.

In an embodiment of the disclosure $A^1$, $A^3$, $A^4$, $A^5$, $A^6$, $A^7$, $A^9$, $A^{10}$, $A^{11}$ and $A^{12}$ are each a fluoride.

In an embodiment of the disclosure $R^1$ is an optionally substituted hydrocarbyl group or an optionally substituted heteroatom containing hydrocarbyl group.

In an embodiment of the disclosure $R^1$ is a hydrogen.

In an embodiment of the disclosure $R^1$ is an optionally substituted hydrocarbyl group.

In an embodiment of the disclosure $R^1$ is a substituted hydrocarbyl group.

In an embodiment of the disclosure $R^1$ is a hydrocarbyl group.

In an embodiment of the disclosure $R^1$ is an optionally substituted alkyl group.

In an embodiment of the disclosure $R^1$ is a substituted alkyl group.

In an embodiment of the disclosure $R^1$ is a substituted alkyl group having one or more than one halide atom.

In an embodiment of the disclosure $R^1$ is a substituted alkyl group having one or more than one fluoride atom.

In an embodiment of the disclosure $R^1$ is an alkyl group.

In an embodiment of the disclosure $R^1$ is an alkyl group having from 1 to 20 carbon atoms.

In an embodiment of the disclosure $R^1$ is an alkyl group having from 1 to 8 carbon atoms.

In an embodiment of the disclosure $R^1$ is a methyl group.

In the current disclosure, the term "activatable", means that the ligand X may be cleaved from the metal center M via a protonolysis reaction or abstracted from the metal center M by suitable acidic or electrophilic catalyst activator compounds (also known as "co-catalyst" compounds) respectively, examples of which are described below. The activatable ligand X may also be transformed into another ligand which is cleaved or abstracted from the metal center M (e.g. a halide may be converted to an alkyl group). Without wishing to be bound by any single theory, protonolysis or abstraction reactions generate an active "cationic" metal center which can polymerize olefins.

In embodiments of the present disclosure, the activatable ligand, X is independently selected from the group consisting of a hydrogen atom; a halogen atom, a $C_{1-10}$ hydrocarbyl radical; a $C_{1-10}$ alkoxy radical; and a $C_{6-10}$ aryl or aryloxy radical, where each of the hydrocarbyl, alkoxy, aryl, or aryl oxide radicals may be un-substituted or further substituted by one or more halogen or other group; a $C_{1-8}$ alkyl; a $C_{1-8}$ alkoxy, a $C_{6-10}$ aryl or aryloxy; an amido or a phosphido radical, but where X is not a cyclopentadienyl. Two X ligands may also be joined to one another and form for example, a substituted or unsubstituted diene ligand (i.e., 1,3-butadiene); or a delocalized heteroatom containing group such as an acetate or acetamidinate group. In a convenient embodiment of the disclosure, each X is independently selected from the group consisting of a halide atom, a $C_{1-4}$ alkyl radical and a benzyl radical.

In an embodiment, particularly suitable activatable ligands are monoanionic such as a halide (e.g. chloride) or a hydrocarbyl (e.g. methyl, benzyl).

The catalyst activator (or simply the "activator" for short) used to activate the olefin polymerization catalyst can be any suitable activator including one or more activators selected from the group consisting of alkylaluminoxanes and ionic activators, optionally together with an alkylating agent.

Without wishing to be bound by theory, alkylaluminoxanes are thought to be complex aluminum compounds of the formula: $R^3_2Al^1O(R^3Al^1O)_mAl^1R^3_2$, wherein each $R^3$ is independently selected from the group consisting of $C_{1-20}$ hydrocarbyl radicals and m is from 3 to 50. Optionally a hindered phenol can be added to the alkylaluminoxane to provide a molar ratio of $Al^1$:hindered phenol of from 2:1 to 5:1 when the hindered phenol is present.

In an embodiment of the disclosure, $R^3$ of the alkylaluminoxane, is a methyl radical and m is from 10 to 40.

The alkylaluminoxanes are typically used in substantial molar excess compared to the amount of olefin polymerization catalyst. The $Al^1$:olefin polymerization catalyst metal molar ratios may be from about 10:1 to about 10,000:1, preferably from about 30:1 to about 500:1.

In an embodiment of the disclosure, the catalyst activator comprises methylaluminoxane (MAO).

In an embodiment of the disclosure, the catalyst activator comprises modified methylaluminoxane (MMAO).

It is well known in the art, that the alkylaluminoxane can serve dual roles as both an alkylator and an activator. Hence, an alkylaluminoxane activator is often used in combination with activatable ligands such as halogens.

Alternatively, the catalyst activator of the present disclosure may be a combination of an alkylating agent (which may also serve as a scavenger) with an activator capable of ionizing the group 4 metal of the olefin polymerization catalyst, or pre-catalyst (i.e. an ionic activator). In this context, the activator can be chosen from one or more alkylaluminoxane and/or an ionic activator, since an alkylaluminoxane may serve as both an activator and an alkylating agent.

When present, the alkylating agent may be selected from the group consisting of $(R^4)_pMgX^2_{2-p}$ wherein $X^2$ is a halide and each $R^4$ is independently selected from the group consisting of $C_{1-10}$ alkyl radicals and p is 1 or 2; $R^4Li$ wherein in $R^4$ is as defined above, $(R^4)^qZnX^2_{2-q}$ wherein $R^4$ is as defined above, $X^2$ is halogen and q is 1 or 2; and $(R^4)_sAl^2X^2_{3-s}$ wherein $R^4$ is as defined above, $X^2$ is halogen and s is an integer from 1 to 3. In embodiments of the disclosure, in the above compounds $R^4$ is a $C_{1-4}$ alkyl radical, and $X^2$ is chlorine. Commercially available compounds include triethyl aluminum (TEAL), trimethylaluminum, triisobutyl aluminum, tributyl aluminum, diethyl aluminum chloride (DEAC), dibutyl magnesium ($(Bu)_2Mg$), and butyl ethyl magnesium (BuEtMg or BuMgEt). Alkylaluminoxanes can also be used as alkylating agents.

The ionic activator may be selected from the group consisting of: (i) compounds of the formula $[R^5]^+[B(R^6)_4]^-$ wherein B is a boron atom, $R^5$ is a cyclic $C_{5-7}$ aromatic cation or a triphenyl methyl cation and each $R^6$ is independently selected from the group consisting of phenyl radicals which are unsubstituted or substituted with from 3 to 5 substituents selected from the group consisting of a fluorine atom, a $C_{1-4}$ alkyl or alkoxy radical which is unsubstituted or substituted by a fluorine atom; and a silyl radical of the formula $—Si—(R^7)_3$; wherein each $R^7$ is independently selected from the group consisting of a hydrogen atom and a $C_{1-4}$ alkyl radical; and (ii) compounds of the formula $[(R^8)_tZH]^+[B(R^6)_4]^-$ wherein B is a boron atom, H is a hydrogen atom, Z is a nitrogen atom or phosphorus atom, t is 2 or 3 and $R^8$ is selected from the group consisting of $C_{1-8}$ alkyl radicals, a phenyl radical which is unsubstituted or substituted by up to three $C_{1-4}$ alkyl radicals, or one $R^8$ taken together with the nitrogen atom may form an anilinium radical and $R^6$ is as defined above; and (iii) compounds of the formula $B(R^6)_3$ wherein $R^6$ is as defined above.

In embodiments of the disclosure, in the above compounds $R^6$ is a pentafluorophenyl radical, and $R^5$ is a triphenylmethyl cation, Z is a nitrogen atom and $R^8$ is a $C_{1-4}$ alkyl radical or $R^8$ taken together with the nitrogen atom forms an anilinium radical which is substituted by two $C_{1-4}$ alkyl radicals.

Examples of compounds capable of ionizing the phosphinimide catalyst include the following compounds: triethylammonium tetra(phenyl)boron, tripropylammonium tetra (phenyl)boron, tri(n-butyl)ammonium tetra(phenyl)boron, trimethylammonium tetra(p-tolyl)boron, trimethylammonium tetra(o-tolyl)boron, tributylammonium tetra(pentafluorophenyl)boron, tripropylammonium tetra (o,p-dimethylphenyl)boron, tributylammonium tetra(m,m-dimethylphenyl)boron, tributylammonium tetra(p-trifluoromethylphenyl)boron, tributylammonium tetra (pentafluorophenyl)boron, tri(n-butyl)ammonium tetra (o-tolyl)boron, N,N-dimethylanilinium tetra(phenyl)boron, N,N-diethylanilinium tetra(phenyl)boron, N,N-diethylanilinium tetra(phenyl)n-butylboron, N,N-2,4,6-pentamethylanilinium tetra(phenyl)boron, di-(isopropyl)ammonium tetra(pentafluorophenyl)boron, dicyclohexylammonium tetra (phenyl)boron, triphenylphosphonium tetra)phenyl)boron, tri(methylphenyl)phosphonium tetra(phenyl)boron, tri (dimethylphenyl)phosphonium tetra(phenyl)boron, tropillium tetrakispentafluorophenyl borate, triphenylmethylium tetrakispentafluorophenyl borate, benzene (diazonium) tetrakispentafluorophenyl borate, tropillium phenyltris-pentafluorophenyl borate, triphenylmethylium phenyl-trispentafluorophenyl borate, benzene (diazonium) phenyltrispentafluorophenyl borate, tropillium tetrakis (2,3,5,6-tetrafluorophenyl) borate, triphenylmethylium tetrakis (2,3,5,6-tetrafluorophenyl) borate, benzene (diazonium) tetrakis (3,4,5-trifluorophenyl) borate, tropillium tetrakis (3,4,5-trifluorophenyl) borate, benzene (diazonium) tetrakis (3,4,5-trifluorophenyl) borate, tropillium tetrakis (1,2,2-trifluoroethenyl) borate, trophenylmethylium tetrakis (1,2,2-trifluoroethenyl) borate, benzene (diazonium) tetrakis (1,2,2-trifluoroethenyl) borate, tropillium tetrakis (2,3,4,5-tetrafluorophenyl) borate, triphenylmethylium tetrakis (2,3,4,5-tetrafluorophenyl) borate, and benzene (diazonium) tetrakis (2,3,4,5-tetrafluorophenyl) borate.

Commercially available activators which are capable of ionizing the phosphinimide catalyst include: N,N-dimethylaniliniumtetrakispentafluorophenyl borate ("$[Me_2NHPh][B(C_6F_5)_4]$"); triphenylmethylium tetrakispentafluorophenyl borate ("$[Ph_3C][B(C_6F_5)_4]$"); and trispentafluorophenyl boron.

In an embodiment of the disclosure, the ionic activator compounds may be used in amounts which provide a molar ratio of group 4 transition metal to boron that will be from 1:1 to 1:6.

Optionally, mixtures of alkylaluminoxanes and ionic activators can be used as activators for the olefin polymerization catalyst.

The olefin pre-polymerization catalysts of the present disclosure may be used in any conventional olefin polymerization process, such as gas phase polymerization, slurry phase polymerization or solution phase polymerization. The use of a "heterogenized" catalyst system is preferred for use in gas phase and slurry phase polymerization while a homogeneous catalyst is preferred for us in a solution phase polymerization. A heterogenized catalyst system may be formed by supporting a pre-polymerization catalyst, optionally along with an activator on a support, such as for example, a silica support, as is well known to persons skilled in the art.

Solution polymerization processes for the polymerization or copolymerization of ethylene are well known in the art (see for example U.S. Pat. Nos. 6,372,864 and 6,777,509). These processes are conducted in the presence of an inert hydrocarbon solvent, typically, a $C_{5-12}$ hydrocarbon which may be unsubstituted or substituted by $C_{1-4}$ alkyl group such as pentane, methyl pentane, hexane, heptane, octane, cyclohexane, methylcyclohexane and hydrogenated naphtha. An example of a suitable solvent which is commercially available is "Isopar E" ($C_{8-12}$ aliphatic solvent, Exxon Chemical Co.).

The polymerization temperature in a conventional solution process is from about 80° C. to about 300° C. In an embodiment of the disclosure the polymerization temperature in a solution process is from about 120° C. to about 250° C. The polymerization pressure in a solution process may be a "medium pressure process", meaning that the pressure in the reactor is less than about 6,000 psi (about 42,000 kiloPascals or kPa). In an embodiment of the disclosure, the polymerization pressure in a solution process may be from about 10,000 to about 40,000 kPa, or from about 14,000 to about 22,000 kPa (i.e. from about 2,000 psi to about 3,000 psi).

Suitable monomers for copolymerization with ethylene include $C_{3-20}$ mono- and di-olefins. Comonomers include $C_{3-12}$ alpha olefins which are unsubstituted or substituted by up to two $C_{1-6}$ alkyl radicals, $C_{8-12}$ vinyl aromatic monomers which are unsubstituted or substituted by up to two substituents selected from the group consisting of $C_{1-4}$ alkyl radicals, $C_{4-12}$ straight chained or cyclic diolefins which are unsubstituted or substituted by a $C_{1-4}$ alkyl radical. Illustrative non-limiting examples of such alpha-olefins are one or more of propylene, 1-butene, 1-pentene, 1-hexene, 1-octene and 1-decene, styrene, alpha methyl styrene, and the constrained-ring cyclic olefins such as cyclobutene, cyclopentene, dicyclopentadiene norbornene, alkyl-substituted norbornenes, alkenyl-substituted norbornenes and the like (e.g. 5-methylene-2-norbornene and 5-ethylidene-2-norbornene, bicyclo-(2,2,1)-hepta-2,5-diene).

In embodiments, the polyethylene polymers which may be prepared in accordance with the present disclosure are LLDPE's and may comprise not less than 60, or not less than 75 weight % of ethylene with the balance being one or more $C_{4-10}$ alpha olefins, such as alpha-olefins selected from the group consisting of 1-butene, 1-hexene and 1-octene.

In embodiments of the disclosure, the alpha olefin present in a polyethylene polymer, may be present in an amount from about 3 to 30 weight %, or from about 4 to 25 weight %.

The polyethylene prepared in accordance with the present disclosure may be LLDPE having a density from about 0.910 to 0.935 g/cm$^3$ or (linear) high density polyethylene having a density above 0.935 g/cm$^3$. The present disclosure might also be useful to prepare polyethylene having a density below 0.910 g/cm$^3$—the so-called very low and ultra-low density polyethylenes.

The present disclosure may also be used to prepare co- and ter-polymers of ethylene, propylene and optionally one or more diene monomers. Generally, such polymers will contain about 50 to about 75 weight % ethylene, or from about 50 to 60 weight % ethylene and correspondingly from 50 to 25 weight % of propylene. A portion of the monomers, typically the propylene monomer, may be replaced by a conjugated diolefin. The diolefin may be present in amounts up to 10 weight % of the polymer although typically is present in amounts from about 3 to 5 weight %. The resulting polymer may have a composition comprising from 40 to 75 weight % of ethylene, from 50 to 15 weight % of propylene and up to 10 weight % of a diene monomer to provide 100 weight % of the polymer. Non-limiting examples of dienes are dicyclopentadiene, 1,4-hexadiene, 5-methylene-2-norbornene, 5-ethylidene-2-norbornene and 5-vinyl-2-norbornene, especially 5-ethylidene-2-norbornene and 1,4-hexadiene.

In solution polymerization, the monomers are dissolved/dispersed in the solvent either prior to being fed to the reactor (or for gaseous monomers the monomer may be fed to the reactor so that it will dissolve in the reaction mixture). Prior to mixing, the solvent and monomers are generally purified to remove potential catalyst poisons such as water, oxygen or metal impurities. The feedstock purification follows standard practices in the art, e.g. molecular sieves, alumina beds and oxygen removal catalysts are used for the purification of monomers. The solvent itself as well (e.g. methyl pentane, cyclohexane, hexane or toluene) may be treated in a similar manner.

The feedstock may be heated or cooled prior to feeding to the reactor.

Generally, the catalyst components (the olefin pre-polymerization catalyst, an ionic activator and optionally an alkylaluminoxane) may be premixed in the solvent for the reaction or fed as separate streams to the reactor. In some instances, premixing it may be desirable to provide a reaction time for the catalyst components prior to entering the reaction. Such an "in line mixing" technique is described in a number of patents in the name of DuPont Canada Inc. (e.g. U.S. Pat. No. 5,589,555 issued Dec. 31, 1996).

An embodiment of the disclosure is a polymerization process comprising polymerizing ethylene optionally with one or more $C_{3-12}$ alpha olefins in the presence of a polymerization catalyst system comprising: i) a catalyst composition having the formula:

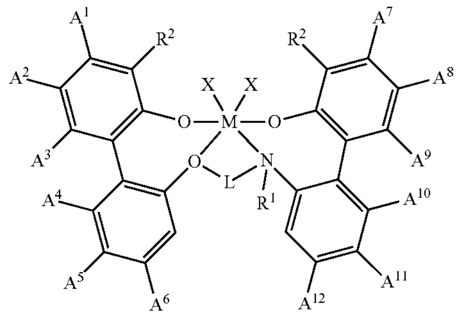

wherein M is Hf or Zr; $R^1$ is a hydrogen, an optionally substituted hydrocarbyl group, or an optionally substituted heteroatom containing hydrocarbyl group; each $R^2$ is independently an optionally substituted hydrocarbyl group, or an optionally substituted heteroatom containing hydrocarbyl group; each of $A^1$, $A^2$, $A^3$, $A^4$, $A^5$, $A^6$, $A^7$, $A^8$, $A^9$, $A^{10}$, $A^{11}$ and $A^{12}$ is a hydrogen, a halide, an optionally substituted hydrocarbyl group, or an optionally substituted heteroatom containing hydrocarbyl group; L is an optionally substituted bivalent hydrocarbyl group, or an optionally substituted bivalent heteroatom containing hydrocarbyl group; optionally two or more adjacent A groups may be part of a ring structure; and each X is independently an activatable leaving group; and ii) a catalyst activator.

In an embodiment of the disclosure, the polymerization process is a solution phase polymerization process carried out in a solvent.

In an embodiment of the disclosure, the polymerization process comprises polymerizing ethylene with one or more $C_{3-12}$ alpha olefins.

In an embodiment of the disclosure, the polymerization process comprises polymerizing ethylene with 1-octene.

Further non-limiting details of the disclosure are provided in the following examples. The examples are presented for the purposes of illustrating selected embodiments of this disclosure, it being understood that the examples presented do not limit the claims presented.

EXAMPLES

General Experimental Methods

All reactions were conducted under nitrogen using standard Schlenk techniques or in an inert atmosphere glovebox. Reaction solvents were purified using the system described by Grubbs et al. (see: Pangborn, A. B.; Giardello, M. A.; Grubbs, R. H.; Rosen R. K.; Timmers, F. J. *Organometallics* 1996, 15, 1518-1520) and then stored over activated molecular sieves in an inert atmosphere glovebox. 13× molecular sieves were purchased from Grace and activated at 260° C. overnight. 2,6-di-tert-butyl-4-ethylphenol (BHEB), was purchased from Aldrich and used as received. MMAO-7 (7 wt. % solution in ISOPAR-E) was purchase from Akzo Nobel and used as received. Triphenylcarbenium tetrakis(pentafluorophenyl)borate was purchased from Albemarle Corp. and used as received. Deuterated NMR solvents, toluene-$d_8$ and dichloromethane-$d_2$, were purchased from Aldrich and stored over 13× molecular sieves prior to use. NMR spectra were recorded on a Bruker 400 MHz spectrometer ($^1$H: 400.1 MHz).

Molecular weight information ($M_w$, $M_n$ and $M_z$ in g/mol) and molecular weight distribution ($M_w/M_n$), and z-average molecular weight distribution ($M_z/M_w$) were analyzed by gel permeation chromatography (GPC), using an instrument sold under the trade name "Waters 150c", with 1,2,4-trichlorobenzene as the mobile phase at 140° C. The samples were prepared by dissolving the polymer in this solvent and were run without filtration. Molecular weights are expressed as polyethylene equivalents with a relative standard deviation of 2.9% for the number average molecular weight ("Mn") and 5.0% for the weight average molecular weight ("Mw"). Polymer sample solutions (1 to 2 mg/mL) were prepared by heating the polymer in 1,2,4-trichlorobenzene (TCB) and rotating on a wheel for 4 hours at 150° C. in an oven. The antioxidant 2,6-di-tert-butyl-4-methylphenol (BHT) was added to the mixture in order to stabilize the polymer against oxidative degradation. The BHT concentration was 250 ppm. Sample solutions were chromatographed at 140° C. on a PL 220 high-temperature chromatography unit equipped with four SHODEX columns (HT803, HT804, HT805 and HT806) using TCB as the mobile phase with a flow rate of 1.0 mL/minute, with a differential refractive index (DRI) as the concentration detector. BHT was added to the mobile phase at a concentration of 250 ppm to protect the columns from oxidative degradation. The sample injection volume was 200 mL. The raw data were processed with CIRRUS® GPC software. The columns were calibrated with narrow distribution polystyrene standards. The polystyrene molecular weights were converted to polyethylene molecular weights using the Mark-Houwink equation, as described in the ASTM standard test method D6474.

The branch frequency of copolymer samples (i.e. the short chain branching, SCB per 1000 backbone carbon atoms) and the $C_8$ comonomer content (in wt. %) was determined by Fourier Transform Infrared Spectroscopy (FTIR) as per the ASTM D6645-01 method. A Thermo-Nicolet 750 Magna-IR Spectrophotometer equipped with OMNIC® version 7.2a software was used for the measurements.

The determination of branch frequency as a function of molecular weight (and hence the comonomer distribution) was carried out using high temperature Gel Permeation Chromatography (GPC) and FT-IR of the eluent. Polyethylene standards with a known branch content, polystyrene and hydrocarbons with a known molecular weight were used for calibration.

Catalyst Synthesis

The general synthetic steps and methods employed to make the ligand, L and the pre-catalysts of Examples 1 and 2, are provided below.

Compound A:

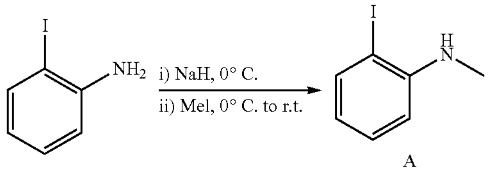

A

To a 200 mL Schlenk flask charged with 45.7 mmol (10 g) of 2-iodoaniline in 90 mL of dry THF, was slowly added NaH (2.009 g, 1.1 equiv., 60% in dispensing oil) at 0° C. After the resulted pale grey suspension was stirred at 0° C. for one hour, then was slowly warmed to room temperature, followed by dropwise addition of MeI (3.2 mL, 1.1 equiv.) at 0° C. After the reaction was stirred at room temperature overnight, it was concentrated in vacuo and diluted in dichloromethane, DCM. The organic layer was washed with water and a brine solution, then was dried with $Na_2SO_4$, filtered, concentrated in vacuo to afford a deep red oil (10.24 g, 94%). $^1$H NMR indicates about 15% over-alkylating product. The crude product was subjected to next reaction without further purification. $^1$H NMR (400 MHz, $CD_2Cl_2$, δ): 7.64(dd, 1H), 7.23(td, 1H), 6.56(dm, 1H), 6.43(tm, 1H), 4.22(br.s, 1H), 2.87(d, 3H, J=5 Hz).

Compound B:

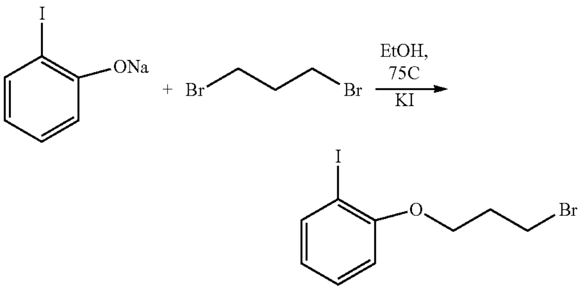

B

2-Iodophenol (11.0 g, 50 mmol) in an EtOH solution (30 mL) was added to a stirred solution of NaOH (2 g, 50 mmol) and KI (0.83 g, 5mmol) in EtOH (40 mL). The mixture was stirred for 3 hours at room temperature. This solution was slowly added to a solution of 1,2-dibromopropane (50 g, 248 mmol) in EtOH (50 mL) in 1.5 hours. The mixture was stirred at 75° C. over a weekend and was pumped to dryness. An aqueous solution of NaOH (100 mL, 2M) and diethyl ether (150 mL) was used to work up the reaction. The organic layer was dried with $MgSO_4$ and was pumped to dryness. 9.8 g of crystalline solid was obtained by vacuum distillation (140° C.). $^1$H NMR (400 MHz, $CD_2Cl_2$, δ): 7.77 (d, 1H), 7.32(dd, 1H), 6.86(d, 1H), 6.73(dd, 1H), 4.15(t, 2H, J=6 Hz), 3.72(t, 2H, J=6 Hz), 2.36(p, 2H, J=6 Hz).

Compound C:

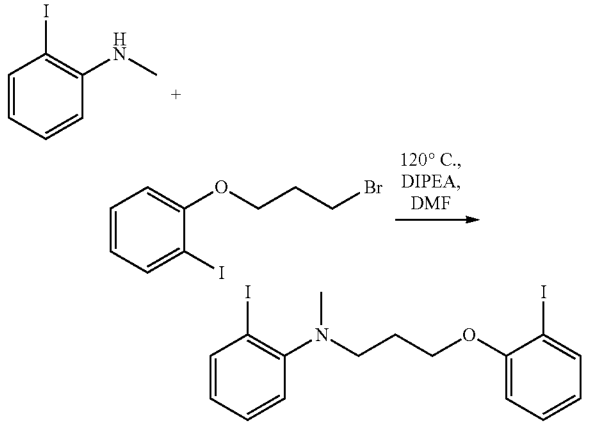

C

To a 200 mL two-neck round bottom flask charged with 43 mmol (8.71 g) of crude compound A in 65 mL DMF, was added compound B (13 g, 1.2 equiv.) and diisopropylethylamine (DIPEA,14 mL, 2.5 equiv.). After the resulting clear orange solution was heated at 120° C. for 4 days, it was concentrated in vacuo and diluted in $Et_2O$ (150 mL). The organic layer was washed with $H_2O$ (200 mL×5), then brine solution, then was dried with $Na_2SO_4$, filtered, and concentrated in vacuo to afford a crude oil. The crude oil was dissolved in 100 mL $Et_2O$, filtered to remove some solids. 4.2 mL of HCl (12M) was added to the diethyl ether solution to produce a slurry. The slurry was vigorously stirred for one hour and was filtered. The solid was washed with $Et_2O$ and was dissolved in $CH_2Cl_2$ (100 mL). The solution was washed with 1M NaOH and brine. The organic phase was dried with $Na_2SO_4$, filtered, concentrated in vacuo to afford a deep red oil. The final product was purified by distillation (125° C. under full vacuum) to give a pure product as light orange oil (2.3 g). $^1$H NMR (400 MHz, $CD_2Cl_2$) δ ppm 7.85 (dd, J=7.9, 1.4 Hz, 1H), 7.74 (dd, J=7.8, 1.6 Hz, 1H), 7.31-7.37 (m, 1H), 7.25-7.31 (m, 1H), 7.19 (dd, J=8.0, 1.5 Hz, 1H), 6.84 (dd, J=8.1, 1.3 Hz, 1H), 6.81 (ddd,J=7.7, 7.3, 1.5 Hz, 1H), 6.69 (ddd, J=7.9, 7.6, 1.4 Hz, 1 H), 4.12 (t, J=6.2 Hz, 2H), 3.22 (t, J=6.9 Hz, 2H), 2.71 (s, 3H), 2.02 (tt, J=6.9, 6.2 Hz, 2H).

Compound D:

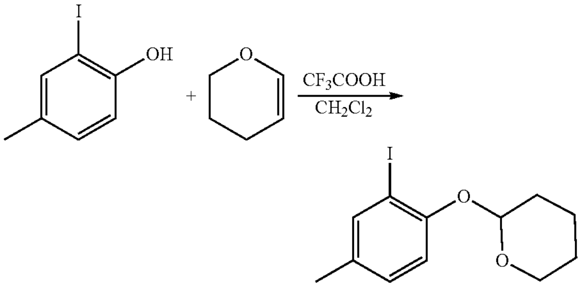

D 2-iodo-4-methylphenol (13.0 g, 55.55 mmol) and 3,4-dihydropyran (4.90 g, 58.25 mmol) were weighed in a 250 mL round bottomed flask. Dichloromethane (15 mL) was added to the flask. While the mixture was stirred, $CF_3COOH$ (1.27 g, 20 mol %) in a 10 mL hypo vial was added dropwise. The vial was rinsed with 5 mL of dichloromethane and the rinsing solution was added to the flask. The mixture was stirred for 3.5 hours (note: a reaction time of more than 3.5 hours lead to side products) and quenched by slow addition of a 30 mL saturated sodium carbonate aqueous solution. Dichloromethane was removed by vacuum pumping and a NaOH solution (1M, 150 mL) and diethyl ether (250 mL) was added to the flask. The contents were transferred to a separatory funnel and vigorously shaken. The organic phase was washed thoroughly with a NaOH solution (3×150 mL) to completely remove any trace amount of 2-iodo-4-methylphenol. The diethyl ether solution was dried with anhydrous $MgSO_4$. A solution in pentane/ethyl acetate (volume ratio 19:1, 400 mL) was filtered through a silica gel plug (diameter 1", 3" high) and GC-MS showed that the product was pure (M+=318). The solvents were removed under vacuum to give the product as an almost colorless oil (17.5 g).

Compound E:

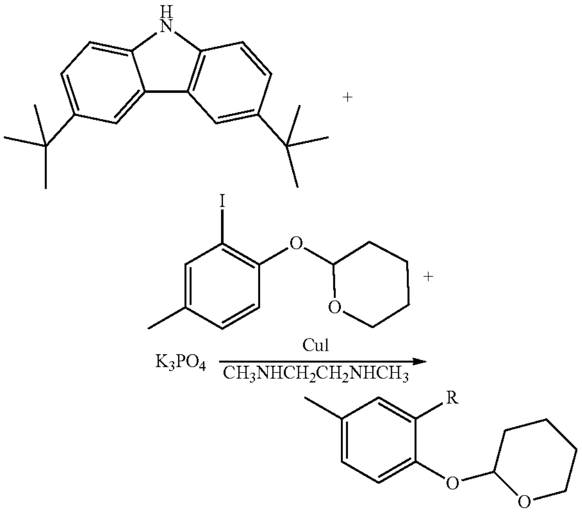

E

R =

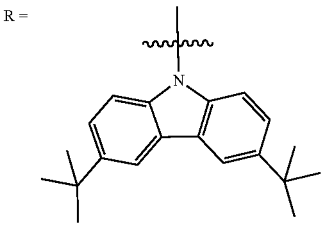

3,6-di-tert-butyl-9H-carbazole (11.35 g, 40.60 mmol), tetrahydro-2-(2-iodo-4-methylphenoxy)-2H-pyran (12.92 g, 40.60 mmol; compound D), anhydrous $K_3PO_4$ (25.8 g, 121.80 mol), CuI (1.65 g, 8.65 mmol) and $CH_3NHCH_2CH_2NHCH_3$ (1.14 g, 13 mmol) were weighed into a 250 mL Schlenk flask. The mixture was refluxed (at 130° C. bath temperature) for 48 hours. The contents were filtered through an 8" diameter 1" silica gel plug and the plug was rinsed with 300 mL of toluene. The light yellow filtrate was roto-vaped to dryness (an oil) and 60 mL of acetonitrile was added. The solution was let to stand and crystals began to form after about 10 minutes. After 48 hours, the solid product was filtered and was rinsed with cold acetonitrile (2×30 mL, −20° C.). 13.0 g of product was obtained after drying under vacuum. $^{1}H$ NMR (400 MHz, $CD_2Cl_2$) δ ppm 8.15(d, J=2 Hz, 2H), 7.44(td, J=2 Hz, J=9 Hz, 2H), 7.30(d, J=2 Hz, 1H), 7.29(s, 1H), 7.24(dd, J=2 Hz, J=9 Hz, 1H), 7.16(d, J=9 Hz, 1H), 7.09(d, J=9 Hz, 1H), 5.19(t, J=3 Hz, 1H), 3.68(td, J=3 Hz, J=11 Hz, 1H), 3.44(dt, J=4 Hz, J=11 Hz, 1H), 2.38(s, 3H), 1.46(s, 18H), 1.44-1.34(m, 2H), 1.33-1.23(m, 1H), 1.22-1.03(m, 3H).

Compound F:

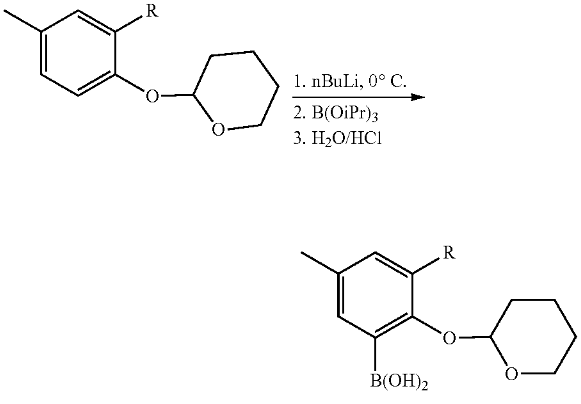

F

R =

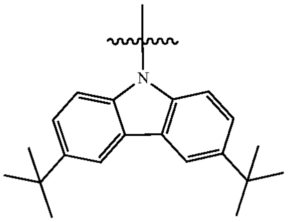

To a 1 L three-neck round bottom flask containing compound E (10.0 g, 21.3 mmol) in 400 mL dry THF, was slowly added a solution of 1.6 M nBuLi (16 mL, 25.55 mmol, 1.2 equiv.) at 0° C. After the resulting mixture was warmed to room temperature and stirred for 3 hours, B(OiPr$_3$) (5.2 g, 27.68 mmol) was added to the reaction mixture dropwise at 0° C. The resulting mixture was then allowed to stir at room temperature overnight. The reaction was concentrated in vacuo and quenched with $H_2O$ (300 mL). The mixture was then stirred for 30 minutes and the white suspension was extracted with $Et_2O$ (3×200 mL). The combined organic layers were washed with $H_2O$, then brine solution, then were dried with $Na_2SO_4$, and filtered to afford the final product (10.1 g, 93%). $^{1}H$ NMR (400 MHz, $CD_2Cl_2$) δ ppm 8.17 (d, J=1.8 Hz, 1H), 8.13 (d, J=1.8 Hz, 1H), 7.69 (d, J=1.8 Hz, 1H), 7.49 (dd, J=8.6, 1.9 Hz, 1H), 7.44 (dd, J=8.7, 1.9 Hz, 1H),7.36 (d, J=1.9 Hz, 1H), 7.23 (d, J=8.6 Hz, 1H), 7.00 (d, J=8.7 Hz, 1H), 6.34 (s, 2H), 4.00 (dd, J=9.0, 2.3 Hz, 1H), 3.83 (ddd, J=11.4, 2.2, 1.5 Hz, 1H), 3.04 (td, J=11.5, 2.6 Hz, 1H), 2.40 (s, 3H), 1.47 (s, 9H), 1.44 (s, 9H), 1.31 (dd, J=8.3, 6.2 Hz, 3H), 1.13-1.20 (m, 1H), 0.96 (tdd, J=12.8, 12.8, 9.0, 4.1 Hz, 1H), 0.46-0.68 (m, 1H), 0.29 (dd, J=13.4, 2.3 Hz, 1H)

Ligand L:

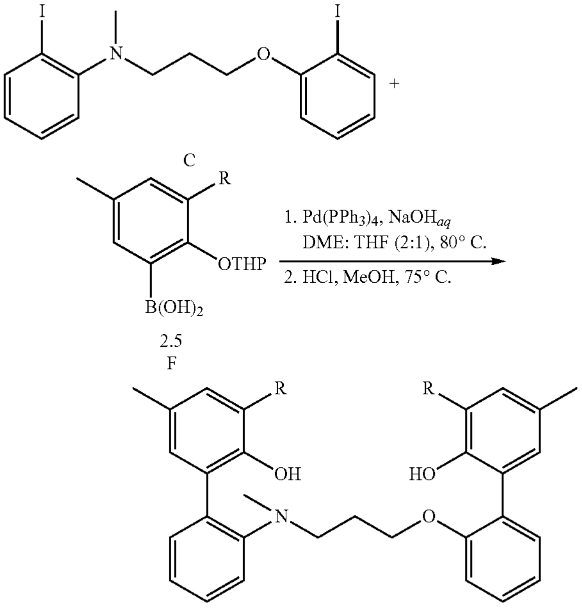

C 2.5

F

L

R =

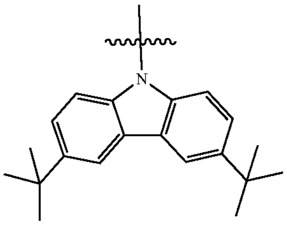

To a 500 mL three-neck round bottom flask charged with compound C (2.3 g, 4.67 mmol), compound F (6 g, 11.68 mmol, 2.5 equiv.), and $Pd(PPh_3)_4$ (270 mg, 0.23 mmol, 0.05 equiv.) in 50 mL dry THF, was added a solution of 0.65 M NaOH (degassed solution, 1.3 g in 50 mL of water, 7.0 equiv.) and 100 mL degassed dimethoxyethane. After the resulting mixture was refluxed for 3 days, it was concentrated in vacuo and extracted with DCM (~80 mL), the organic layer was washed with $H_2O$, then brine solution, then was dried with $Na_2SO_4$, filtered, and concentrated in vacuo to afford brown solid. The crude product was added to a 500 mL round bottom flask, followed by 200 mL MeOH and 2 mL of HCl (12M). After the hazy orange solution was refluxed overnight, it was concentrated in vacuo and diluted in $Et_2O$, the organic layer was washed with $H_2O$, then brine solution, then was dried with $Na_2SO_4$, filtered, and concentrated in vacuo to afford a pale-yellow solid. The final product was purified by filtering through silica plug, followed by recrystallization in acetonitrile (3.25 g, 70% over two steps). $^{1}H$ NMR (400 MHz, $CD_2Cl_2$) δ ppm 10.70 (s, 1H), 8.14(s, 4H), 7.49 (dd, J=7.3, 2.0 Hz, 1H), 7.38 (dd, J=8.6, 7.3 Hz, 1H), 7.38 (d,J=1.9 Hz, 1H), 7.37 (dd, J=8.6, 7.3 Hz, 1H), 7.38 (dd, J=8.5, 7.9 Hz, 1H), 7.37 (dd, J=8.7, 2.0 Hz, 5H), 7.30 (d, J=1.9 Hz, 1H), 7.22-7.26 (m, 2H), 7.18-7.21 (m, 3H), 7.16 (d, J=1.9 Hz, 1H), 7.07 (d, J=8.8 Hz, 3H), 7.03 (d, J=8.6 Hz, 2H), 6.81 (d, J=7.3 Hz, 1H), 6.69 (d, J=7.9 Hz, 1H), 5.80 (s, 1H), 3.83 (t, J=5.9 Hz, 2H), 2.86 (dd, J=7.6, 7.4 Hz, 2H), 2.38 (d, J=4.0 Hz, 6H), 2.33 (s, 3H), 1.78 (ddt, J=7.6, 7.4, 5.9, 5.9 Hz, 2H), 1.78 (ddt, J=7.6, 7.4, 5.9, 5.9 Hz, 2H), 1.43 (s, 18H), 1.42 (s, 19H).

Pre-Catalyst, Example 1

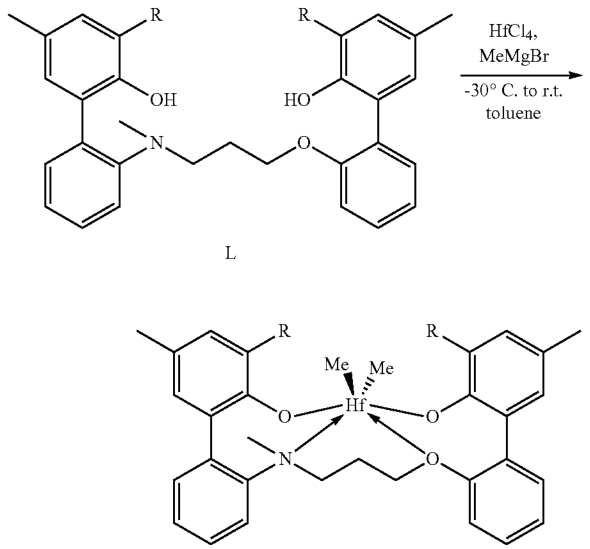

L

R =

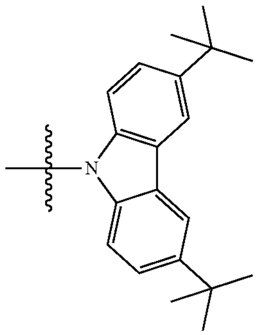

To a 200 mL Schlenk flask charged with $HfCl_4$ (222 mg, 0.69 mmol) in 30 mL dry toluene, was added a solution of 3M MeMgBr (1.04 mL, 4.5 equiv., vial was rinsed with 5 mL dry $Et_2O$) at −30° C. After the resulting clear solution was stirred at −30° C. for 15 minutes, was slowly added a solution of ligand L (700 mg, 0.69 mmol) in 20 mL of dry toluene and rinsed with dry toluene (2×20 mL). The resulting hazy off-white mixture was stirred at −30° C. for an hour, then warmed up to room temperature overnight. The reaction was concentrated, and then extracted with heptane (3×50 mL). The heptane layers were combined and concentrated to provide the final pre-catalyst as an off-white solid (0.705 g, 83%). $^1H$ NMR (400 MHz, toluene-d8) δ ppm 8.59 (d, J=1.4 Hz, 1H), 8.53 (d, J=1.4 Hz, 1H), 8.31 (d, J=1.1 Hz, 1H), 8.24 (d, J=1.1 Hz, 1H), 7.58 (dd, J=8.6, 1.8 Hz, 1H), 7.55 (dd, J=8.6, 1.8 Hz, 1H), 7.48 (d, J=8.5 Hz, 1H), 7.34-7.46 (m, 3H), 7.21-7.34 (m, 4H), 7.16 (d, J=1.8 Hz, 1H), 7.04-7.09(m, 2H), 7.00 (d, J=2.7 Hz, 1H), 6.80-6.91 (m, 1H), 6.70-6.80 (m, 3H), 5.80 (d, J=8.5 Hz, 1H), 5.05 (ddd, J=7.5, 2.0, 1.0 Hz, 1H), 4.22 (br ddd, J=11.1, 1.0 Hz, 1H), 3.57 (br ddd, J=12.1, 1.0 Hz, 1H), 2.94 (br ddd, J=10.4, 1.0 Hz, 1H), 2.28 (s, 2H), 2.29 (dddd, J=12.1, 11.1, 10.4, 7.5 Hz, 1H), 2.21 (s, 3H), 1.86-1.96 (m, 3H), 1.62 (m, 1H), 1.61 (s, 9H), 1.57 (s, 9H), 1.30 (s, 9H), 1.26 (s, 9H), 0.42 (br d, J=14.9 Hz, 1H), −1.21 (s, 3H), −1.52 (s, 3H).

Pre-Catalyst, Example 2

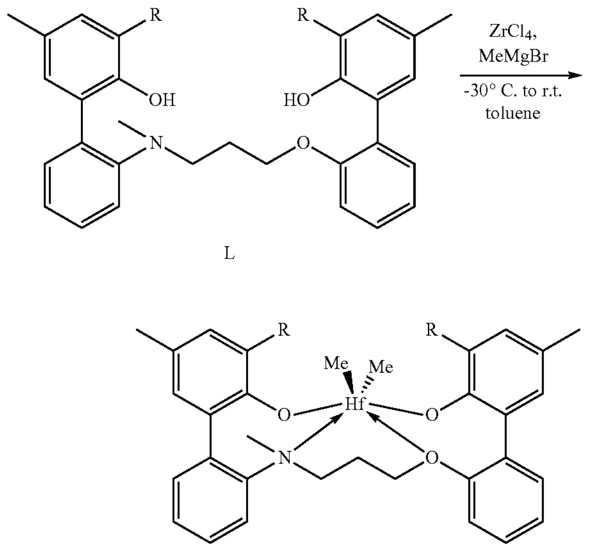

L

R =

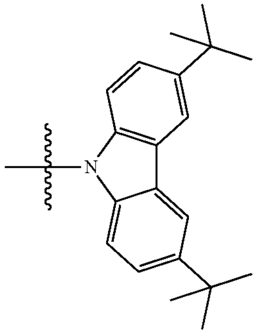

To a 300 mL Schlenk flask charged with $ZrCl_4$ (463 mg, 1.98 mmol) in 100 mL dry toluene, was added a solution of 3M MeMgBr (3 mL, 4.5 equiv.) at −30° C. After the resulting clear solution was stirred at −30° C. for 15 minutes, a solution of ligand L (2.0 g, 1.98 mmol) in 20 mL of dry toluene was added very slowly at −30° C. (the vial was rinsed with dry toluene, 3×10 mL). The resulting hazy brown mixture was stirred at −30° C. for an hour, then warmed up to room temperature overnight in a cold bath. The reaction was dried by vacuum, and then extracted with heptane (3×100 mL). The heptane layers were combined and concentrated to provide the final pre-catalyst as an off-white solid (1.33 g, 59%). $^1H$ (400 MHz, toluene-d8) δ ppm 8.58 (d, J=1.4 Hz, 1H), 8.53 (d, J=1.4 Hz, 1H), 8.30 (d, J=1.3 Hz, 1H), 8.24 (d, J=1.2 Hz, 1H), 7.55 (dd, J=8.7, 2.0 Hz, 1H), 7.58(dd, J=8.7, 2.0 Hz, 1H), 7.44 (d, J=8.7 Hz, 1H), 7.43 (d, J=8.7 Hz, 1H), 7.49 (d, J=8.7 Hz, 1H), 7.46 (d, J=8.7 Hz, 1H), 7.30 (dd, J=8.6, 2.0 Hz, 2H), 7.26 (dd, J=8.7, 2.0 Hz, 1H), 7.25 (ddd, J=8.1, 3.7, 1.8 Hz, 1H), 7.15 (d, J=4309.8 Hz, 1H), 7.09 (d, J=2.2 Hz, 1H), 7.05 (d, J=2.1 Hz, 1H), 6.84 (t, J=8.0 Hz, 1H), 6.77 (d, J=7.6 Hz, 1H), 6.69-6.75 (m, 2H), 5.77 (d, J=8.3 Hz, 1H), 5.05 (dd, J=6.1, 3.4 Hz, 1H), 4.17 (br t, J=10.8 Hz, 1H), 3.53 (br t, J=12.0 Hz, 1H), 2.93 (br d, J=9.5 Hz, 1H), 2.28 (s, 3H), 2.21 (s, 3H), 1.88 (s, 3H), 1.61 (s, 9H), 1.57 (s, 9H), 1.49 (br d, J=14.0 Hz, 1H), 1.30 (s, 9H),1.26 (s, 9H), 0.42 (br d, J=14.0 Hz, 1H), -0.99 (s, 3H), -1.27 (s, 3H).

Solution Polymerization

Continuous solution polymerizations were conducted on a continuous polymerization unit (CPU) using cyclohexane as the solvent. The CPU contained a 71.5 mL stirred reactor and was operated at a temperature of 140° C. or 160° C. for the polymerization experiments. An upstream mixing reactor having a 20 mL volume was operated at 5° C. lower than the polymerization reactor. The mixing reactor was used to pre-heat the ethylene, 1-octene and some of the solvent streams. Catalyst feeds (xylene or cyclohexane solutions of the pre-catalyst complex and $(Ph_3C)[B(C_6F_5)_4]$ as a catalyst activator) and additional solvent were added directly to the polymerization reactor in a continuous process. Additional feeds of MMAO-7 and 2,6-di-tert-butyl-4ethylphenol (BHEB) and solvent are pre-mixed in order to passivate the trimethylaluminium (TMA) before entering the polymerization unit. A total continuous flow of 27 mL/min into the polymerization reactor was maintained.

Copolymers were made at a 1-octene/ethylene weight ratio of 0.1 to 0.5. The ethylene was fed at a 10 wt. % ethylene concentration in the polymerization reactor. The CPU system operated at a pressure of 10.5 MPa. The solvent, monomer, and comonomer streams were all purified by the CPU systems before entering the reactor. The polymerization activity, $k_p$ (expressed in $mM^{-1} \cdot min^{-1}$), is defined as:

$$k_p = \left(\frac{Q}{100 - Q}\right)\left(\frac{1}{[M]}\right)\left(\frac{1}{HUT}\right)$$

where Q is ethylene conversion (%) (measured using an online gas chromatograph (GC)), [M] is catalyst concentration in the reactor (mM), and HUT is hold-up time in the reactor (2.6 min).

Copolymer samples were generally collected at 90±1% ethylene conversion (Q), dried in a vacuum oven, ground, and then analyzed using FTIR (for short-chain branch frequency) and GPC-RI (for molecular weight and distribution). Polymerization conditions are listed in Table 1 and copolymer properties are listed in Table 2.

Inventive copolymerizations of ethylene with 1-octene with the pre-catalyst of Example No. 1 (the hafnium based catalyst) were carried out as polymerization Run Nos. 1 to 4.

Inventive copolymerizations of ethylene with 1-octene with the pre-catalyst of Example No. 2 (the zirconium based catalyst) were carried out as polymerization Run Nos. 5 to 9.

Comparative copolymerizations of ethylene with 1-octene using the catalyst (cyclopentadienyl)$((t\text{-}Bu)_3PN)TiCl_2$, as a comparative, were carried out in polymerization Run Nos. 10 and 11. Catalyst feeds (xylene solutions of (cyclopentadienyl)$((t\text{-}Bu)_3PN)TiCl_2$, $(Ph_3C)[B(C_6F_5)_4]$ and MMAO-7/BHEB) and additional solvent were added directly to the polymerization reactor in a continuous process. MMAO-7 and BHEB solution flows were combined prior to the reactor to ensure that all of the phenolic OH had been passivated through reaction with MMAO-7 prior to reaching the reactor.

TABLE 1

Ethylene/1-Octene Copolymerization Conditions

| Polymerization Run. No. | Catalyst Example No. | [Metal] (μM) | B (from borate)/M | Al (from MMAO-7)/M | BHEB/Al | Reactor Temp. (° C.) | C2 Flow (g/min) | C8/C2 | C2 Conversion, Q (%) | $k_p$ ($mM^{-1} \cdot min^{-1}$) |
|---|---|---|---|---|---|---|---|---|---|---|
| 1 | 1 | Hf, 21.48 | 1.2 | 0.93 | 0.3 | 160 | 2.7 | 0.3 | 86.15 | 111 |
| 2 | 1 | Hf, 13.33 | 1.2 | 0.89 | 0.3 | 140 | 2.1 | 0.3 | 89.16 | 237 |
| 3 | 1 | Hf, 13.33 | 1.2 | 0.93 | 0.3 | 140 | 2.1 | 0.5 | 90.28 | 268 |
| 4 | 1 | Hf, 12.59 | 1.2 | 0.94 | 0.3 | 140 | 2.1 | 0.15 | 89.81 | 269 |
| 5 | 2 | Zr, 25.93 | 1.2 | 0.77 | 0 | 190 | 3.5 | 0.1 | 75.91 | 47 |
| 6 | 2 | Zr, 7.41 | 1.2 | 2.7 | 0 | 140 | 2.1 | 0.15 | 89.89 | 462 |
| 7 | 2 | Zr, 8.89 | 1.2 | 2.25 | 0 | 140 | 2.1 | 0.3 | 90.49 | 412 |
| 8 | 2 | Zr, 8.89 | 1.2 | 2.25 | 0 | 140 | 2.1 | 0.5 | 89.76 | 379 |
| 9 | 2 | Zr, 25.93 | 1.2 | 0.77 | 0 | 160 | 2.7 | 0 | 88.57 | 115 |
| 10 | Comp. | Ti, 0.18 | 0.21 | 14.07 | 4.22 | 140 | 2.1 | 0.15 | 89.52 | 18675 |
| 11 | Comp. | Ti, 0.24 | 0.24 | 16.30 | 4.89 | 140 | 2.1 | 0.30 | 89.85 | 16714 |

Note:
C2 = ethylene;
C8 = 1-octene

TABLE 2

Copolymer Properties

| Polymerization Run. No. | Catalyst Example No. | FTIR 1-octene content (weight percent, wt %) | FTIR Short Chain Branching per 1000 carbon atoms (SCB/1000 C) | Mw | Mn | Mw/Mn |
|---|---|---|---|---|---|---|
| 1 | 1 | 6.4 | 8.4 | 244258 | 112177 | 2.18 |
| 2 | 1 | 6.8 | 9.0 | 336756 | 145174 | 2.32 |
| 3 | 1 | 11.4 | 15.5 | 300383 | 104776 | 2.87 |
| 4 | 1 | 3.7 | 4.8 | 442408 | 151915 | 2.91 |
| 5 | 2 | 1.3 | 1.6 | 186733 | 97269 | 1.92 |
| 6 | 2 | 2.8 | 3.6 | 262739 | 127627 | 2.06 |
| 7 | 2 | 5.6 | 7.4 | 270245 | 104935 | 2.58 |
| 8 | 2 | 8.2 | 10.9 | 262171 | 115896 | 2.26 |

TABLE 2-continued

| Copolymer Properties | | | | | | |
|---|---|---|---|---|---|---|
| Polymer-ization Run. No. | Catalyst Example No. | FTIR 1-octene content (weight percent, wt %) | FTIR Short Chain Branching per 1000 carbon atoms (SCB/1000 C) | Mw | Mn | Mw/Mn |
| 9 | 2 | N/A | N/A | 235078 | 112978 | 2.08 |
| 10 | Comp. | 2.3 | 2.9 | 193020 | 116080 | 1.66 |
| 11 | Comp. | 4.2 | 5.4 | 143022 | 101897 | 1.64 |

A person skilled in the art will see from the data provided in Tables 1 and 2, that under similar copolymerization conditions, the catalysts of Inventive Examples 1 and 2, provide similar or higher molecular ethylene copolymers relative to the comparative catalyst system, while also incorporating a higher amount of comonomer (i.e. 1-octene) as indicated by the amount of short chain branching per thousand backbone carbon atoms. The new tetradentate catalysts of Inventive Example 1 and 2, and especially the hafnium based catalyst of Example 1, then, provide ethylene 1-octene copolymers with good comonomer incorporation and good molecular weight, when used in a solution phase polymerization process.

Non-limiting embodiments of the present disclosure include the following:

Embodiment A. A polymerization process comprising polymerizing ethylene with one or more $C_{3-12}$ alpha olefins in the presence of a polymerization catalyst system comprising:

i) a catalyst composition having the formula:

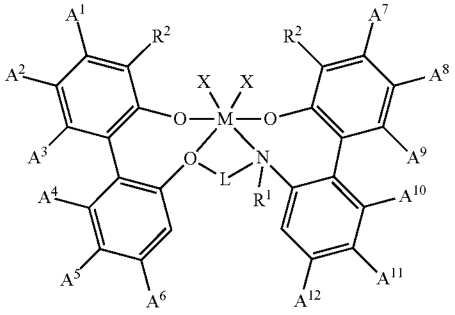

wherein M is Hf or Zr;

$R^1$ is a hydrogen, an optionally substituted hydrocarbyl group, or an optionally substituted heteroatom containing hydrocarbyl group;

each $R^2$ is independently an optionally substituted hydrocarbyl group, or an optionally substituted heteroatom containing hydrocarbyl group;

each of $A^1$, $A^2$, $A^3$, $A^4$, $A^5$, $A^6$, $A^7$, $A^8$, $A^9$, $A^{10}$, $A^{11}$ and $A^{12}$ is a hydrogen, a halide, an optionally substituted hydrocarbyl group, or an optionally substituted heteroatom containing hydrocarbyl group;

L is an optionally substituted bivalent hydrocarbyl group, or an optionally substituted bivalent heteroatom containing hydrocarbyl group;

optionally two or more adjacent A groups may be part of a ring structure; and each X is independently an activatable leaving group; and ii) a catalyst activator.

Embodiment B. The polymerization process of Embodiment A wherein each $R^2$ has the formula:

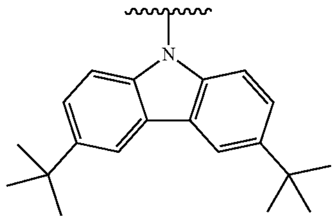 [SMILES: *n1c2ccc(C(C)(C)C)cc2c2cc(C(C)(C)C)ccc21]

Embodiment C. The polymerization process of Embodiment A or B, wherein L is a bivalent hydrocarbyl group.

Embodiment D. The polymerization process of Embodiment A, B, or C wherein L is a bivalent n-propyl group having the formula: $—CH_2CH_2CH_2—$.

Embodiment E. The polymerization process of Embodiment A, B, C, or D wherein $A^2$ and $A^8$ are each a methyl group.

Embodiment F. The polymerization process of Embodiment A, B, C, D, or E wherein $A^1$, $A^3$, $A^4$, $A^5$, $A^6$, $A^7$, $A^9$, $A^{10}$, $A^{11}$ and $A^{12}$ are each a hydrogen.

Embodiment G. The polymerization process of Embodiment A, B, C, D, E, or F wherein $R^1$ is a methyl group.

Embodiment H. The polymerization process of Embodiment A, B, C, D, E, F, or G wherein the polymerization process is a solution phase polymerization process carried out in a solvent.

Embodiment I. The polymerization process of Embodiment A, B, C, D, E, F, G, or H wherein the polymerization process comprises polymerizing ethylene with 1-octene.

Embodiment J. An olefin pre-polymerization catalyst having the formula:

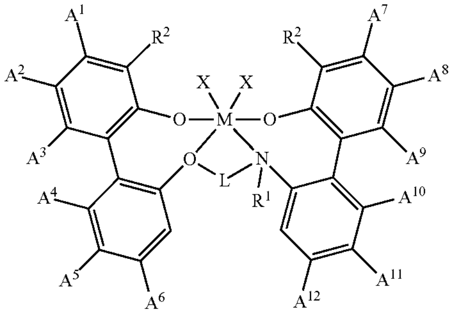

wherein M is Hf or Zr;

$R^1$ is a hydrogen, an optionally substituted hydrocarbyl group, or an optionally substituted heteroatom containing hydrocarbyl group;

each $R^2$ is independently an optionally substituted hydrocarbyl group, or an optionally substituted heteroatom containing hydrocarbyl group;

each of $A^1$, $A^2$, $A^3$, $A^4$, $A^5$, $A^6$, $A^7$, $A^8$, $A^9$, $A^{10}$, $A^{11}$ and $A^{12}$ is a hydrogen, a halide, an optionally substituted hydrocarbyl group, or an optionally substituted heteroatom containing hydrocarbyl group;

L is an optionally substituted bivalent hydrocarbyl group, or an optionally substituted bivalent heteroatom containing hydrocarbyl group;

optionally two or more adjacent A groups may be part of a ring structure; and each X is independently an activatable leaving group.

Embodiment K. The pre-polymerization catalyst of Embodiment J wherein each $R^2$ has the formula:

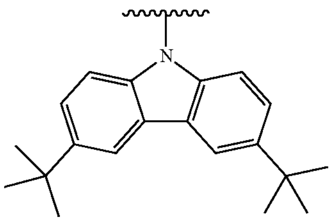 [SMILES: *n1c2ccc(C(C)(C)C)cc2c2cc(C(C)(C)C)ccc21]

Embodiment L. The pre-polymerization catalyst of Embodiment J, or K wherein L is a bivalent hydrocarbyl group.

Embodiment M. The pre-polymerization catalyst of Embodiment J, K, or L wherein L is a bivalent n-propyl group having the formula: $-CH_2CH_2CH_2-$.

Embodiment N. The pre-polymerization catalyst of Embodiment J, K, L, or M wherein $A^2$ and $A^8$ are each a methyl group.

Embodiment O. The pre-polymerization catalyst of Embodiment J, K, L, M, or N wherein $A^1$, $A^3$, $A^4$, $A^5$, $A^6$, $A^7$, $A^9$, $A^{10}$, $A^{11}$ and $A^{12}$ are each a hydrogen.

Embodiment P. The pre-polymerization catalyst of Embodiment J, K, L, M, N, or O wherein $R^1$ is a methyl group.

Embodiment Q. An olefin polymerization catalyst system comprising:

i) a catalyst composition having the formula:

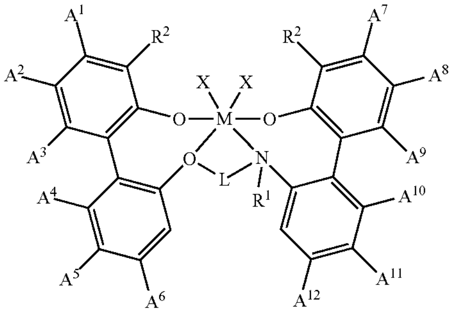

wherein M is Hf or Zr;

$R^1$ is a hydrogen, an optionally substituted hydrocarbyl group, or an optionally substituted heteroatom containing hydrocarbyl group;

each $R^2$ is independently an optionally substituted hydrocarbyl group, or an optionally substituted heteroatom containing hydrocarbyl group;

each of $A^1$, $A^2$, $A^3$, $A^4$, $A^5$, $A^6$, $A^7$, $A^8$, $A^9$, $A^{10}$, $A^{11}$ and $A^{12}$ is a hydrogen, a halide, an optionally substituted hydrocarbyl group, or an optionally substituted heteroatom containing hydrocarbyl group;

L is an optionally substituted bivalent hydrocarbyl group, or an optionally substituted bivalent heteroatom containing hydrocarbyl group;

optionally two or more adjacent A groups may be part of a ring structure; and each X is independently an activatable leaving group; and ii) a catalyst activator.

INDUSTRIAL APPLICABILITY

New polymerization catalysts having a tetradentate ligand are used to copolymerize ethylene with an alpha olefin. The new polymerization catalysts represent examples of "post metallocene" catalysts which may be used in a solution phase olefin polymerization process.

The invention claimed is:

1. A polymerization process comprising polymerizing ethylene with one or more $C_{3-12}$ alpha olefins in the presence of a polymerization catalyst system comprising:

i) an olefin pre-polymerization catalyst having the formula:

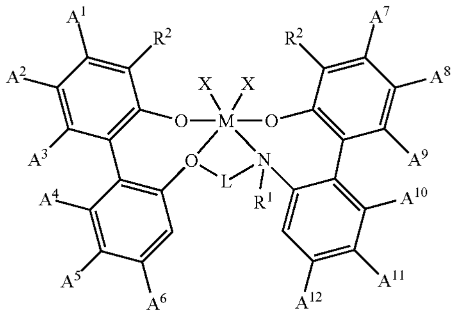

wherein M is Hf or Zr;

$R^1$ is a hydrogen, an optionally substituted hydrocarbyl group, or an optionally substituted heteroatom containing hydrocarbyl group;

each $R^2$ is independently an optionally substituted hydrocarbyl group, or an optionally substituted heteroatom containing hydrocarbyl group;

each of $A^1$, $A^2$, $A^3$, $A^4$, $A^5$, $A^6$, $A^7$, $A^8$, $A^9$, $A^{10}$, $A^{11}$ and $A^{12}$ is a hydrogen, a halide, an optionally substituted hydrocarbyl group, or an optionally substituted heteroatom containing hydrocarbyl group;

L is an optionally substituted bivalent hydrocarbyl group, or an optionally substituted bivalent heteroatom containing hydrocarbyl group;

optionally two or more adjacent A groups may be part of a ring structure; and each X is independently an activatable leaving group; and ii) a catalyst activator.

2. The polymerization process of claim 1 wherein each R2 has the formula:

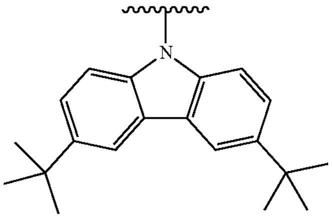 [SMILES: *n1c2ccc(C(C)(C)C)cc2c2cc(C(C)(C)C)ccc21]

3. The polymerization process of claim 2 wherein L is a bivalent hydrocarbyl group.

4. The polymerization process of claim 3 wherein L is a bivalent n-propyl group having the formula: $—CH_2CH_2CH_2—$.

5. The polymerization process of claim 4 wherein $A^2$ and $A^8$ are each a methyl group.

6. The polymerization process of claim 5 wherein $A^1$, $A^2$, $A^3$, $A^4$, $A^5$, $A^6$, $A^7$, $A^8$, $A^9$, $A^{10}$, $A^{11}$ and $A^{12}$ are each a hydrogen.

7. The polymerization process of claim 6 wherein $R^1$ is a methyl group.

8. The polymerization process of claim 1 wherein the polymerization process is a solution phase polymerization process carried out in a solvent.

9. The polymerization process of claim 8 wherein the polymerization process comprises polymerizing ethylene with 1-octene.

10. An olefin pre-polymerization catalyst having the formula:

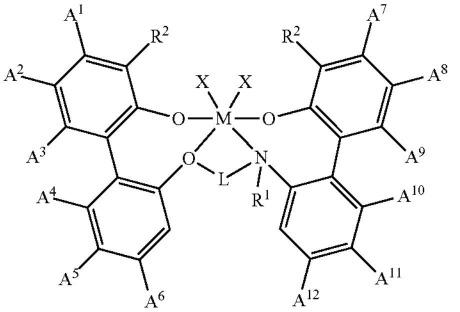

wherein M is Hf or Zr;

$R^1$ is a hydrogen, an optionally substituted hydrocarbyl group, or an optionally substituted heteroatom containing hydrocarbyl group;

each $R^2$ is independently an optionally substituted hydrocarbyl group, or an optionally substituted heteroatom containing hydrocarbyl group;

each of $A^1$, $A^2$, $A^3$, $A^4$, $A^5$, $A^6$, $A^7$, $A^8$, $A^9$, $A^{10}$, $A^{11}$ and $A^{12}$ is a hydrogen, a halide, an optionally substituted hydrocarbyl group, or an optionally substituted heteroatom containing hydrocarbyl group;

L is an optionally substituted bivalent hydrocarbyl group, or an optionally substituted bivalent heteroatom containing hydrocarbyl group;

optionally two or more adjacent A groups may be part of a ring structure; and each X is independently an activatable leaving group.

11. The pre-polymerization catalyst of claim 10 wherein each $R^2$ has the formula:

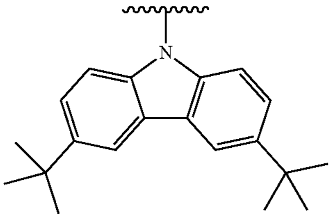 [SMILES: *n1c2ccc(C(C)(C)C)cc2c2cc(C(C)(C)C)ccc21]

12. The pre-polymerization catalyst of claim 11 wherein L is a bivalent hydrocarbyl group.

13. The pre-polymerization catalyst of claim 12 wherein L is a bivalent n-propyl group having the formula: $—CH_2CH_2CH_2—$.

14. The pre-polymerization catalyst of claim 13 wherein $A^2$ and $A^8$ are each a methyl group.

15. The pre-polymerization catalyst of claim 14 wherein $A^1$, $A^2$, $A^3$, $A^4$, $A^5$, $A^6$, $A^7$, $A^8$, $A^9$, $A^{10}$, $A^{11}$ and $A^{12}$ are each a hydrogen.

16. The pre-polymerization catalyst of claim 15 wherein $R^1$ is a methyl group.

17. An olefin polymerization catalyst system comprising:

i) an olefin pre-polymerization catalyst having the formula:

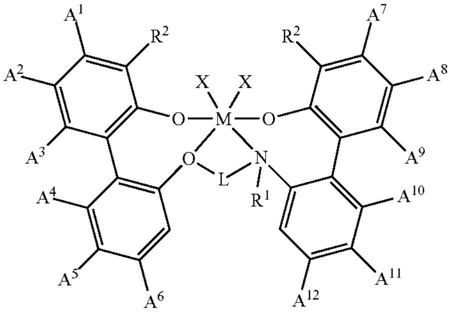

wherein M is Hf or Zr;

$R^1$ is a hydrogen, an optionally substituted hydrocarbyl group, or an optionally substituted heteroatom containing hydrocarbyl group;

each $R^2$ is independently an optionally substituted hydrocarbyl group, or an optionally substituted heteroatom containing hydrocarbyl group;

each of $A^1$, $A^2$, $A^3$, $A^4$, $A^5$, $A^6$, $A^7$, $A^8$, $A^9$, $A^{10}$, $A^{11}$ and $A^{12}$ is a hydrogen, a halide, an optionally substituted hydrocarbyl group, or an optionally substituted heteroatom containing hydrocarbyl group;

L is an optionally substituted bivalent hydrocarbyl group, or an optionally substituted bivalent heteroatom containing hydrocarbyl group;

optionally two or more adjacent A groups may be part of a ring structure; and each X is independently an activatable leaving group; and ii) a catalyst activator.

* * * * *